T. L. Rivers,
Cage Trap,
№ 78,015.    Patented May 19, 1868

Witnesses
Wm. M. Eccles
Charles H. Chapin

Inventor
T. L. Rivers

United States Patent Office.

THOMAS L. RIVERS, OF ST. LOUIS, MISSOURI.

Letters Patent No. 78,015, dated May 19, 1868; antedated May 13, 1868.

IMPROVED ANIMAL-TRAP.

The Schedule referred to in these Letters Patent and making part of the same.

TO ALL WHOM IT MAY CONCERN:

Be it known that I, THOMAS L. RIVERS, of the city and county of St. Louis, State of Missouri, have invented certain new and useful Improvements in Animal-Traps; and I do hereby declare that the following is a full, clear, and exact description thereof, reference being had to the accompanying drawings, and letters of reference marked thereon, which form a part of this specification.

Figure 1:
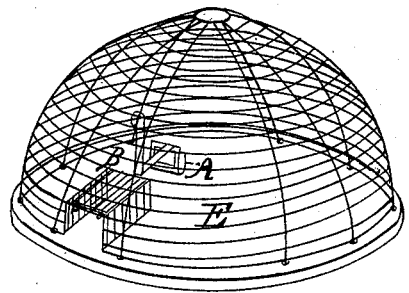

Figure 1, in the drawing, represents a rat and mouse-trap. It consists of a wire cage on a wooden groundwork, with a slide or trap-door, B, which door so works on a hinge that when it falls it effectually closes the doorway to the trap. The doorway is provided with side-pieces, so the animal cannot get out.

Figure 2:
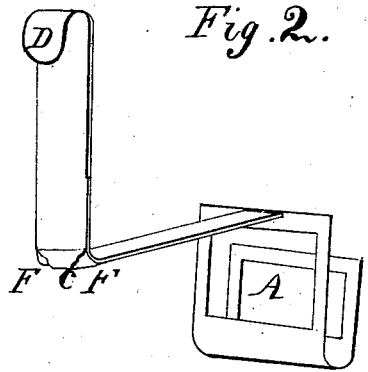

In Figure 2, A is the trigger, with a hook at one end, as seen at D. C is a catch on the trigger, and is provided with shoulders, F F, which serve to throw the trigger. These shoulders project beyond the catch, and are rounded, so the edge of the door will be thrown off the catch C, and, in this case, the door falls and closes the entrance. This trigger is provided with a receiver to hold the bait, and is so constructed that the bait is in front of the door. The hook D is hung on the wire of the trap, so the catch C will come opposite the door, and in such a manner that the door's edge will rest in the catch of the trigger. Now, if you wish to set the trap, lift the door and place it in the catch C of the trigger, and, when the trigger is disturbed by the animal, the door will fall.

I do not claim the door or cage, for they are in common use, but

What I claim as new, and for which I ask Letters Patent of the United States to be granted me, is—

The trigger A, with its rounded shoulders F F and catch C, in combination with the door, as above described, and for the purposes set forth.

T. L. RIVERS.

Witnesses:
   WM. M. ECCLES,
   CHARLES H. CHAPIN.